(12) United States Patent
Stafievsky et al.

(10) Patent No.: US 11,260,736 B1
(45) Date of Patent: Mar. 1, 2022

(54) SYSTEM FOR MOLDING ENCAPSULATION AT GLASS WINDOW PANEL

(71) Applicant: MAGNA MIRRORS OF AMERICA, INC., Holland, MI (US)

(72) Inventors: Vadim A. Stafievsky, Grand Rapids, MI (US); Matthew J. Noorman, Wyoming, MI (US)

(73) Assignee: MAGNA MIRRORS OF AMERICA, INC., Holland, MI (US)

( * ) Notice: Subject to any disclaimer, the term of this patent is extended or adjusted under 35 U.S.C. 154(b) by 687 days.

(21) Appl. No.: 16/100,235

(22) Filed: Aug. 10, 2018

Related U.S. Application Data

(60) Provisional application No. 62/543,555, filed on Aug. 10, 2017.

(51) Int. Cl.
| | | |
|---|---|---|
| *B29C 45/14* | (2006.01) | |
| *B29C 70/74* | (2006.01) | |
| *B60J 10/82* | (2016.01) | |
| *B60J 10/17* | (2016.01) | |
| *B60J 10/79* | (2016.01) | |
| *B29C 65/00* | (2006.01) | |
| *B29C 70/76* | (2006.01) | |

(52) U.S. Cl.
CPC ......... *B60J 10/82* (2016.02); *B29C 45/14434* (2013.01); *B29C 66/72326* (2013.01); *B29C 66/7465* (2013.01); *B29C 70/74* (2013.01); *B29C 70/76* (2013.01); *B60J 10/17* (2016.02); *B60J 10/79* (2016.02)

(58) Field of Classification Search
None
See application file for complete search history.

(56) References Cited

U.S. PATENT DOCUMENTS

| | | | | |
|---|---|---|---|---|
| 4,688,752 | A * | 8/1987 | Barteck | B29C 33/0044 249/85 |
| 4,925,511 | A * | 5/1990 | Ikeda | B29C 70/763 156/106 |
| 5,208,043 | A * | 5/1993 | Gatarz | B29C 33/0044 277/641 |
| 6,120,274 | A | 9/2000 | Gerig et al. | |
| 9,475,370 | B2 | 10/2016 | Snider et al. | |
| 2006/0107600 | A1 | 5/2006 | Nestell et al. | |
| 2008/0106124 | A1 | 5/2008 | Snider | |
| 2011/0272859 | A1 * | 11/2011 | Sitterlet | B29C 45/14377 264/325 |
| 2017/0066305 | A1 | 3/2017 | Tooker et al. | |
| 2017/0067281 | A1 | 3/2017 | Pretzer et al. | |
| 2017/0144524 | A1 | 5/2017 | Snider et al. | |
| 2019/0389293 | A1 | 12/2019 | Scott | |

* cited by examiner

*Primary Examiner* — Armand Melendez
(74) *Attorney, Agent, or Firm* — Honigman LLP

(57) ABSTRACT

A system for overmolding an encapsulation at a perimeter region of a glass window panel includes a mold having a fixed part and a first movable part, and a second movable part. Each of the fixed part and the second movable part has a seal disposed thereat. The fixed part and the first and second movable parts cooperate to receive and support a glass window panel and to define a seal cavity. The second movable part includes an elastomeric or rubber or VITON strip that engages a surface of the glass window panel during overmolding of an encapsulation at the perimeter region of the glass window panel.

7 Claims, 3 Drawing Sheets

SYSTEM FOR MOLDING ENCAPSULATION AT GLASS WINDOW PANEL

CROSS REFERENCE TO RELATED APPLICATION

The present application claims the filing benefits of U.S. provisional application Ser. No. 62/543,555, filed Aug. 10, 2017, which is hereby incorporated herein by reference in its entirety.

FIELD OF THE INVENTION

The present invention relates to a vehicle window panel, such as a window panel for a sunroof window assembly or other vehicle window assembly, and more particularly to a method of manufacturing the window panel.

BACKGROUND OF THE INVENTION

It is known to provide an openable/closable window assembly for an opening in a roof or side of a vehicle. The window panel often includes a perimeter encapsulation to seal the window panel at the vehicle when closed.

SUMMARY OF THE INVENTION

The present invention provides a system or method or molding device for forming or overmolding an encapsulation at a perimeter region of a glass window panel, such as for a glass sunroof of a vehicle or other window of a vehicle. The mold includes a fixed part and a first movable part, each having a seal disposed thereat, and includes a second movable part. The fixed part and the first and second movable parts cooperate to receive and support a glass window panel and to define a seal cavity, with the glass window panel engaging the seals when disposed at the mold. The second movable part includes a rubber or elastomeric or VITON strip that engages a surface of the glass window panel during overmolding of the encapsulation at the perimeter region of the glass window panel. The VITON strip is retained at a retainer plate disposed at one of the movable parts.

These and other objects, advantages, purposes and features of the present invention will become apparent upon review of the following specification in conjunction with the drawings.

DESCRIPTION OF THE PREFERRED EMBODIMENTS

Figure 1:
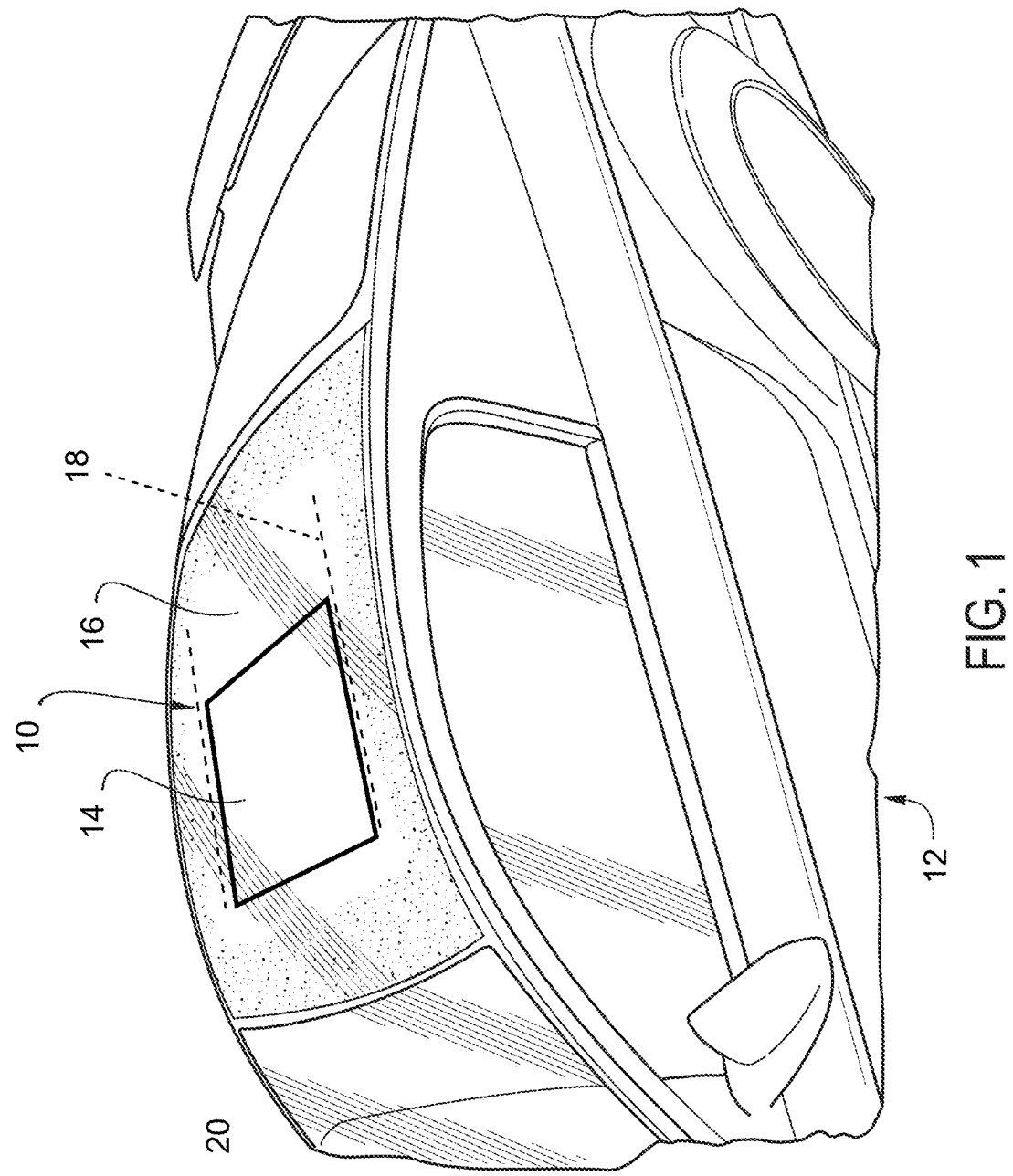
FIG. 1 is a perspective view of a vehicle having a sunroof window in accordance with the present invention.

Referring now to the drawings and the illustrative embodiments depicted therein, a sunroof window assembly 10 of a vehicle 12 (FIG. 1) includes a movable glass window panel 14 that is movable relative to a fixed roof or glass panel 16 of the vehicle 12 between an opened position (where the movable panel 14 is moved at least partially away from an aperture formed or established through said fixed glass roof panel 16) and a closed position (where the movable panel is moved to be generally within the aperture with its outer surface generally flush with the outer surface of the fixed glass panel 16). The movable window panel is movable along a pair of side channels or rails 18 relative to the fixed roof.

Figure 3:
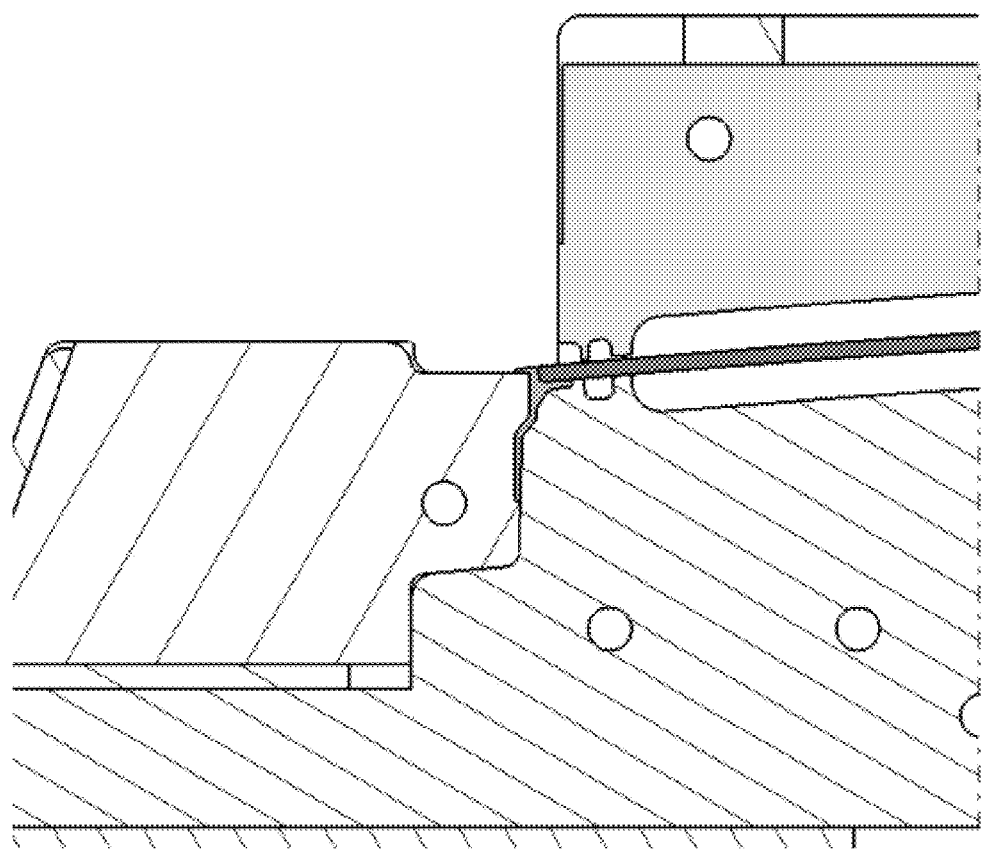
FIG. 3 is a sectional view of another mold device.

The window panel includes a perimeter seal or encapsulation disposed about the periphery of the panel and circumscribing the panel. The encapsulation comprises PVC (or other suitable material) that is overmolded at a surface and perimeter edge of the panel (such as at the interior or lower surface and the perimeter edge of the panel). FIG. 3 shows a cross-section of the glass window panel 20 in the mold 22 that applies or overmolds the encapsulation 24 at the window panel.

The molding system of present invention provides an extruded VITON strip or portion 26 and a retainer plate 28 that are disposed adjacent a movable mold portion 30 that includes a seal track that houses one or more seals that engage the window panel during the molding process. A fixed mold part 32 also includes a seal track for housing another seal that engages the underside of the window panel during the molding process. Another mold part 36 is disposed at the other side of the seal such that the mold parts 32, 36 form a cavity in which a portion of the seal 24 is formed.

The seals are disposed in channels in the movable mold part 30 and the fixed mold part 32 and the seals contact and support the window panel during the molding process. The VITON strip 26 engages and supports the glass at the glass surface, and shuts off the PVC of the encapsulation so that no PVC is disposed at the surface of the glass panel at which the VITON strip is located. The steel part 34 of the mold receives the retainer plate 28, which supports and holds the VITON strip 26.

A known mold does not include the VITON strip and retainer plate and instead supports the glass window only by the seals. The problem with not having the glass supported by anything other than seals becomes evident when seals get a little worn and too low. This causes the glass to touch off against the steel part under PVC pressure on the backside of the glass causing it to bend and leave a mold imprint on the surface of the glass window panel.

Figure 2:
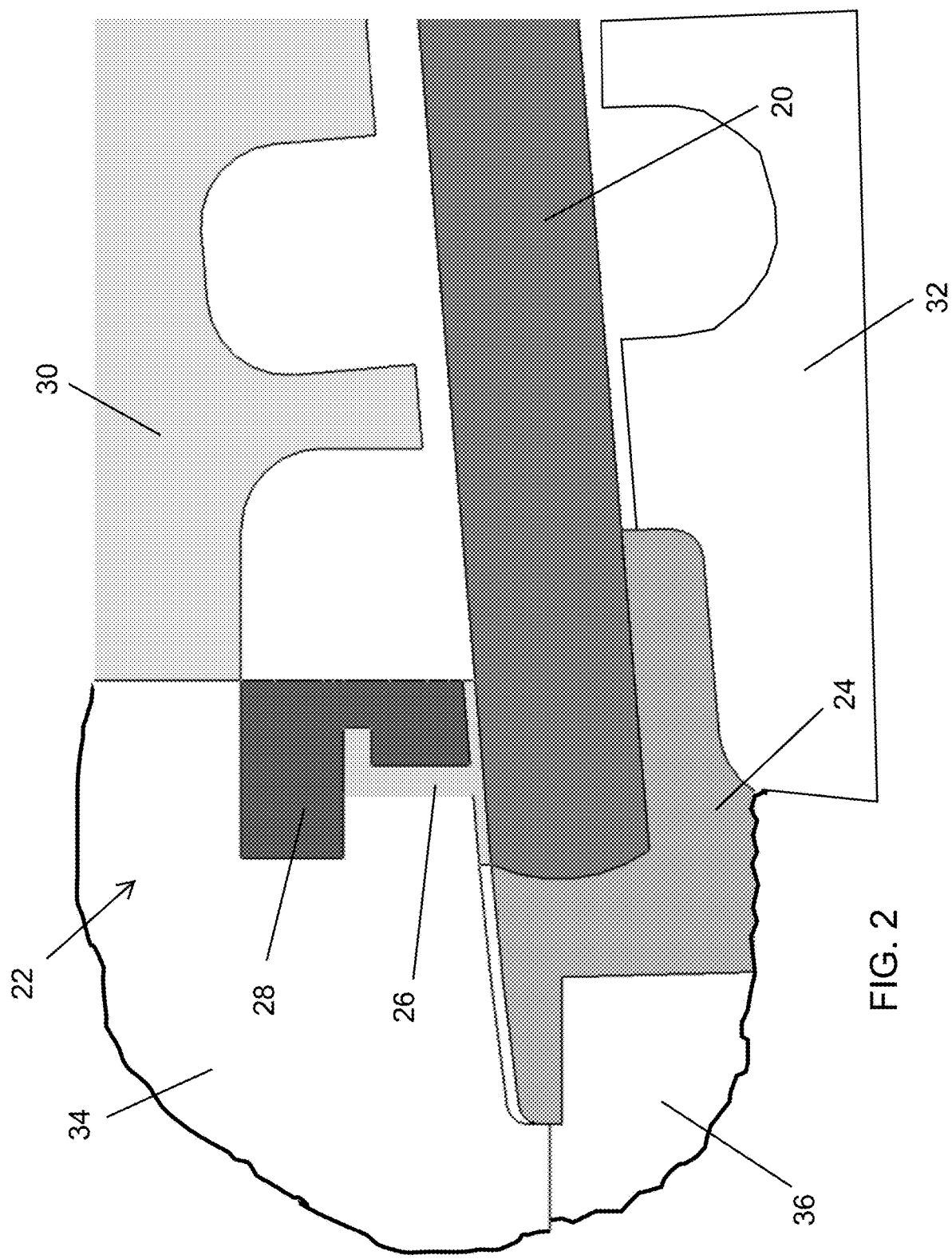
FIG. 2 is a sectional view of a portion of a mold device for molding an encapsulation at a perimeter region of a glass panel in accordance with the present invention.

To rectify this issue, the present invention provides a mold that floats the glass and shuts off PVC with a rubber (VITON) layer 26 (FIG. 2), which prevents the touch off. In conjunction, the mold may also use a VITON layer underneath the seals to give it a bit of the spring back and reduce the wear of the seals, which prolongs the running time. The relative size of the VITON insert may be around 0.2 mm to 0.3 mm in cross-section where the glass is supported and about 0.5 mm in the main stem. The retainer plate may be fastened by the set screws to the mother steel of the mold sunk flushed with the plate to not cause side wear on the seal. The encapsulation is a perimeter installation so it may be sectioned off in 4 sections around the rectangular perimeter of the sunroof mold, possibly more if radii sections become challenging. The rubber or VITON layer or strip comprises a synthetic rubber and fluoropolymer elastomer.

Thus, the system comprises a mold device that has a fixed mold part 32, a first movable mold part 30, and a second movable mold part 34. The fixed part 32 and first movable part 30 are formed to receive the glass panel therebetween, with the fixed part having a recessed portion that receives a portion of the encapsulation 24 therein. When the mold parts are closed or positioned at and around the window panel, the mold parts 32, 36 and 34 form the cavity for the encapsulation 24 to be molded or formed therein. The part 34 includes the VITON insert 26, which engages the surface of the glass panel and limits or precludes the PVC from flowing onto the glass surface and prevents the glass panel from contacting the steel part 34 during the molding process. The system thus provides enhanced molding of the encapsulation 24 at the periphery of the glass panel.

Optionally, the fixed roof may comprise a transparent glass roof and the movable panel may comprise a transparent glass panel. Optionally, a ceramic frit layer or darkened layer or light absorbing layer or the like is disposed at the fixed window at locations where the sunroof channel portions or rails are attached at and at the movable panel where guide portions of the movable panel are attached, so that the channels and guides are not viewable from exterior of the vehicle by a person viewing the glass roof of the vehicle from above the roof. The glass roof and sunroof assembly may utilize aspects of the assemblies described in U.S. Publication No. 2008-0106124 and U.S. Pat. No. 9,475,370, which are hereby incorporated herein by reference in their entireties.

Although shown and described as a glass window panel for a sunroof, the window panel and window assembly of the present invention (and system and method of making the window panel) may be suitable for use in other vehicle window applications, such as a side window panel or a rear window panel or the like.

Changes and modifications to the specifically described embodiments may be carried out without departing from the principles of the present invention, which is intended to be limited only by the scope of the appended claims, as interpreted according to the principles of patent law.

The invention claimed is:

1. A method of overmolding an encapsulation at a perimeter region of a glass window panel, said method comprising: providing a mold having a first part, a second part, a third part and a fourth part, wherein the first part comprises a fixed part and at least the second and third parts comprise movable parts that are movable relative to the first part; positioning a glass panel at the first part, wherein at least the first part engages a first surface of the glass panel; with the glass panel positioned at the first part, moving the second and third parts relative to the first part to support the glass panel at the mold and to form an encapsulation cavity at a perimeter region of the glass panel; wherein moving the third part relative to the first part comprises moving the third part so that an elastomeric strip of the third part engages a second surface of the glass panel opposite the first surface; wherein the elastomeric strip is retained at a retainer plate that is attached at the third part; wherein the first, second, and third parts are configured to form part of the encapsulation cavity at the first surface of the glass panel and at a perimeter edge of the glass panel; and overmolding an encapsulation in the encapsulation cavity at the perimeter region of the glass panel.

2. The method of claim 1, wherein the elastomeric strip comprises a strip of a fluoropolymer elastomer and synthetic rubber compound.

3. The method of claim 1, wherein the first and fourth parts comprise seals for engaging the respective surface of the glass panel.

4. The method of claim 3, wherein the seals of the first and fourth parts include a fluoropolymer elastomer and synthetic rubber compound at a glass-engaging surface of the seals.

5. The method of claim 1, wherein the elastomeric strip of the third part is disposed at the second surface of the glass panel so that, when the encapsulation is overmolded in the encapsulation cavity, the encapsulation is not disposed at the second surface of the glass panel.

6. The method of claim 1, wherein the third part comprises a steel part.

7. The method of claim 6, wherein the elastomeric strip precludes other contact of the third part with the glass panel so the glass panel does not contact a metallic portion of the third part of the mold.

\* \* \* \* \*